Patented Nov. 2, 1948

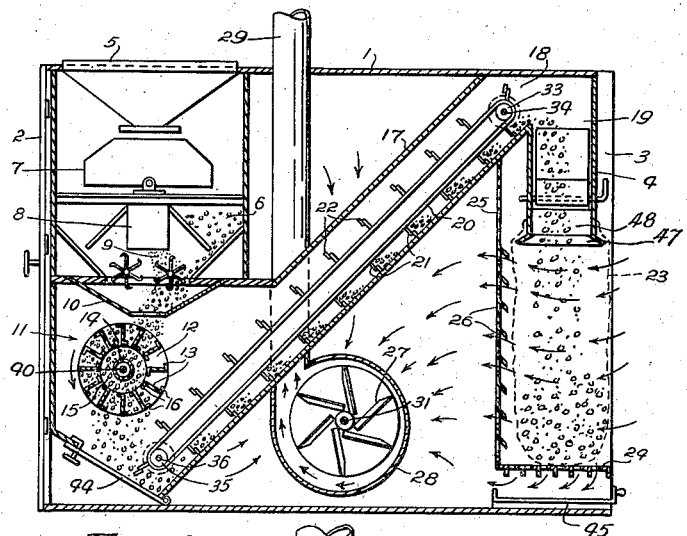

2,452,935

UNITED STATES PATENT OFFICE 2,452,935

APPARATUS FOR TREATING SEEDS WITH CHEMICAL DUST AND BAGGING THE SEEDS

Harold Jesse Kemp, Swift Current, Saskatchewan, Canada

Application April 21, 1944, Serial No. 532,188
In Canada June 7, 1943

2 Claims. (Cl. 226—58)

This invention relates to apparatus for treating seeds with chemical dusts and bagging the seeds.

In the treatment of seeds with fine chemical dusts for disinfecting and for fertilizing purposes, the desirable uniform and intimate commingling of the dust and seeds has heretofore been difficult to accomplish. Violent agitation must be avoided as much as possible to guard against injury to the seeds. Moreover, since the dusts employed are frequently poisonous, dust laden air arising from the mixing operation constitutes a hazard to attendants. The subsequent bagging or handling of the dust-treated seeds also gives rise to dust-laden air which adds to the hazard.

It is an object of the present invention to provide means, (1) for efficiently and uniformly covering measured quantities of seed with desired amounts of dust by non-injurious agitation of the seed and dust, (2) for controlling the dust-laden air rising from such agitation in such manner that the mixing operation is promoted and the free escape of such air is prevented, (3) for associating a bagging operation with the agitating operation, and (4) for controlling the flow of dust-laden air arising from such bagging operation.

Other objects, advantages and details of the invention will become apparent as the description thereof proceeds with particular reference to the accompanying drawing, in which, Figure 1 is a sectional side elevation of an apparatus for carrying out the invention, and Figure 2 is an end elevation of the apparatus, certain parts being removed, sectioned or broken away for clarity of illustration.

In the drawing, 1 is a cabinet or housing for the apparatus having a door 2 at one end and an open recess 3 at the other end for the bagging mechanism 4. A hopper 5 projects through the top of the cabinet and is adapted to receive a measured quantity of seed 6 to be treated. The hopper outlet communicates with any suitable dust-distributing mechanism 7, including a dispenser 8 for scattering dust 9 on the flowing seed. A stream of dust and seed flows by gravity from the outlet 10 of the dust distributor onto a mixing or commingling device 11, which constitutes an important feature of the present invention.

The device 11 comprises a slowly revolving baffle wheel 12 having an axial cylindrical baffle 14 and a plurality of radial vanes or baffles 13, the inner ends of which are spaced from the baffle 14 to provide a space 15 therebetween. A preferable speed of rotation of the wheel 12 is 40 revolutions per minute. The vanes 13 have short right angular flanges 16 at either end.

It will be observed that, as the main stream of dust and seed falls upon the baffle wheel, it is divided into several streams falling between the upwardly moving vanes 13. Portions of such streams are carried around by the revolving vanes and the remaining portions continue through the space between the vanes, into the space 15 and onto the cylindrical baffle 14, from whence they flow between the lower revolving vanes. The flanges 16 on the vanes, as well as the central baffle 14, constitute dust-collecting and dispersing surfaces, and prevent the settling of quantities of undispersed dust. Moreover, in operation a thin layer of dust clings to all surfaces of the baffles and vanes to promote further the coating of each seed with dust.

The slow speed of rotation of the baffle wheel does not injure the seed but is sufficient to cause a dispersion of dust into the surrounding air. Settling of dust from the air thus takes place onto the streams of seed moving therethrough.

Self-contained means for delivering the treated seeds to the bagging mechanism comprise an inclined elevator leg 17, the lower portion of which extends into the accumulated mixture discharged from the baffle wheel 12 and the upper portion of which discharges through opening 18 into a delivery chute 19 of the bagging mechanism. Preferably, the chute is provided with two outlets 47 through each of which the treated mixture is alternately discharged, a manually controlled flap valve 48 being provided to direct the mixture through one or other of the outlets. Thus, while a filled bag is being removed from one outlet and an empty bag placed in filling relation thereto, the discharge of mixture may continue through the other outlet into another bag. The elevator consists of an endless chain 20 with flight wings 21 thereon. The wings 21 are preferably provided with flexible tips 22 of rubber or other suitable material to reduce noise and avoid injury to the seed. It will be observed that, since the elevator leg communicates with the space surrounding the baffle wheel 12, the dust-laden air gains access to the seed being elevated and dust from the air may therefore settle thereon.

The bagging mechanism is of usual construction, a bag 23 being shown in dotted lines in conjunction therewith. It will be observed that the floor of the bagging recess is formed by a grating 24 and that the partition 25 which separates the bagging compartment from the rest of the cabinet is provided with louvres or openings 26.

Means for preventing undesirable escape of dust-laden air from the cabinet and for collecting and controlling the dust-laden air arising from the bagging operation comprises a pair of fans 27 mounted in housings 28 communicating with exhaust pipes 29 and having inlets 30 adjacent the bottom portion of the cabinet. Since the fans create a suction within the cabinet, escape of dust-laden air therefrom is avoided. Since outside air in the vicinity of the bagging space is drawn into the cabinet through the grating 24 and louvres 26, no dust or fume laden air rises from this area to affect attendants. The movement of air is indicated by the arrows in the drawing.

A simple and efficient driving means for the various parts is illustrated. The fans are mounted on a single shaft 31 driven by a pulley 32. The conveyor chain 20 is mounted on an upper sprocket 33 carried by a shaft 34 and a lower sprocket 35 carried by a shaft 36. The upper shaft 34 is driven from the fan shaft 31 by means of the driving pulleys 37 and 38 and belt 39. The baffle wheel 12 is mounted on a shaft 40 driven from the lower conveyor shaft 36 by means of pulleys 41 and 42 and belt 43.

An easily accessible inclined clean-out door 44 is provided adjacent the lower end of the conveyor. A clean-out pan 45 is provided beneath the grating 24 of the bagging space.

The invention described provides a most efficient and satisfactory method and means for thoroughly and adequately coating seeds with dust, without danger of injury to the seeds under treatment and with avoidance of discomfort and possible harm to attendant operators.

It will be obvious that many changes in details and arrangements may be made without departing from the spirit and scope of the invention as defined in the appended claims.

I claim:

1. In apparatus for treating and bagging seeds including a cabinet, means in one portion of the cabinet for mixing seed and dust, and means in a second portion of the cabinet for depositing the mixed seed and dust in a bag in said second portion, means for conveying mixed seed and dust from the first portion to the second portion, a partition dividing said portions of the cabinet, said second portion being open to permit insertion and removal of bags, means providing an exhaust passage leading from said first portion of the cabinet, said partition having openings therein providing a plurality of air passages leading from the space surrounding the bag in the second portion to the exhaust passage in the first portion of the cabinet, and suction means in the exhaust passage for creating a plurality of air streams flowing through said air passages to collect in said streams the dust-laden air surrounding the bag in said second portion of the cabinet.

2. In apparatus for treating and bagging seeds including a cabinet having an open end and a door closing the other end thereof, means in one portion of the cabinet adjacent the closed end for mixing seed and dust, means in a second portion of the cabinet adjacent the open end for delivering the mixed seed and dust to a bag in the second portion, and means for conveying mixed seed and dust from the first portion to the second portion: a partition and a bag supporting wall separating the second portion from the first portion, said bag supporting wall extending at right angles to the partition, an exhaust conduit leading from the first portion and having an inlet therein, said partition and wall each having a plurality of openings therein to provide air passages leading from the space surrounding the bag in the second portion to said exhaust conduit inlet in the first portion, and fan means in the exhaust conduit inlet for creating a plurality of air streams flowing from said space in the second portion through said passages into the exhaust conduit to collect in said streams the dust-laden air surrounding the bag in said second portion.

HAROLD JESSE KEMP.

REFERENCES CITED

The following references are of record in the file of this patent:

UNITED STATES PATENTS

| Number | Name | Date |
|---|---|---|
| 90,932 | Crowley | June 6, 1869 |
| 842,116 | Reid | Jan. 22, 1907 |
| 1,279,791 | Utting | Sept. 24, 1918 |
| 1,473,165 | Steigmeyer | Nov. 6, 1923 |
| 1,651,390 | Hersman | Dec. 6, 1927 |
| 1,552,400 | Aspden | Sept. 1, 1925 |
| 1,698,436 | Hendrickson | Jan. 8, 1929 |
| 1,897,361 | Calkins | Feb. 14, 1933 |
| 2,143,497 | Rahmberg | Jan. 10, 1939 |
| 2,027,261 | Wright | Jan. 7, 1936 |
| 1,800,583 | Wolf | Apr. 14, 1931 |
| 1,863,775 | Ward | June 21, 1932 |

FOREIGN PATENTS

| Number | Country | Date |
|---|---|---|
| 282,842 | Canada | 1927 |